(12) United States Patent
Ankney

(10) Patent No.: US 11,614,355 B2
(45) Date of Patent: Mar. 28, 2023

(54) AIRCRAFT ACTUATOR FLUID LEVEL DETECTION

(71) Applicant: Hamilton Sundstrand Corporation, Charlotte, NC (US)

(72) Inventor: Darrell E. Ankney, Dixon, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 928 days.

(21) Appl. No.: 16/510,219

(22) Filed: Jul. 12, 2019

(65) Prior Publication Data

US 2021/0010844 A1   Jan. 14, 2021

(51) Int. Cl.
*G01F 23/24* (2006.01)
*B64D 45/00* (2006.01)
*F16N 29/02* (2006.01)

(52) U.S. Cl.
CPC ............ *G01F 23/24* (2013.01); *B64D 45/00* (2013.01); *F16N 29/02* (2013.01); *F16N 2250/18* (2013.01)

(58) Field of Classification Search
CPC ......... G01F 23/24; B64D 45/00; F16N 29/02; F16N 2250/18; F16N 29/04
See application file for complete search history.

(56) References Cited

U.S. PATENT DOCUMENTS

| | | |
|---|---|---|
| 4,823,625 A | 4/1989 | Hamilton |
| 5,802,728 A * | 9/1998 | Karnick ............... G01D 5/2405 33/366.18 |
| 7,516,650 B2 | 4/2009 | Discenzo |
| 7,690,246 B1 | 4/2010 | Discenzo |
| 9,182,079 B2 | 11/2015 | Dorr et al. |
| 9,222,822 B2 | 12/2015 | Sinha et al. |
| 9,316,630 B2 | 4/2016 | Hodgkinson et al. |
| 2007/0018833 A1 | 1/2007 | Higashionji et al. |
| 2019/0154200 A1 | 5/2019 | Glasser et al. |

FOREIGN PATENT DOCUMENTS

| | | |
|---|---|---|
| GB | 2304418 A | 3/1997 |
| WO | 2016076937 A1 | 5/2016 |

OTHER PUBLICATIONS

European Search Report for Application No. 20182296.2, dated Dec. 11, 2020, 9 pages.

* cited by examiner

*Primary Examiner* — Yuen Wong
(74) *Attorney, Agent, or Firm* — Cantor Colburn LLP

(57) ABSTRACT

Disclosed is an actuator level detection system of an aircraft. The system includes an actuator containing fluid that defines a resistivity and including a first contact point and a second contact point. The system includes a first contactor disposed about the actuator cooperating with the first contact point to define a first contact resistance that includes the resistivity. The system includes sensor circuitry includes a conductive path defining a conductive path resistance, between the first contact point and the second contact point. The sensor circuitry has a total resistance that includes the first contact resistance and the conductive path resistance.

12 Claims, 4 Drawing Sheets

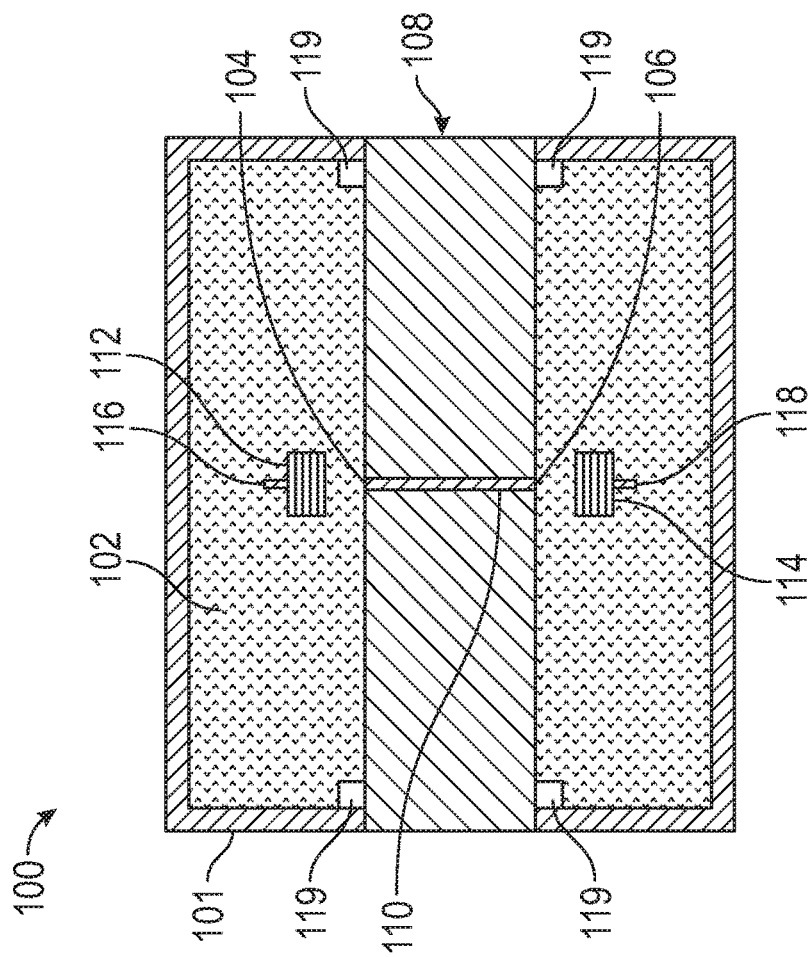
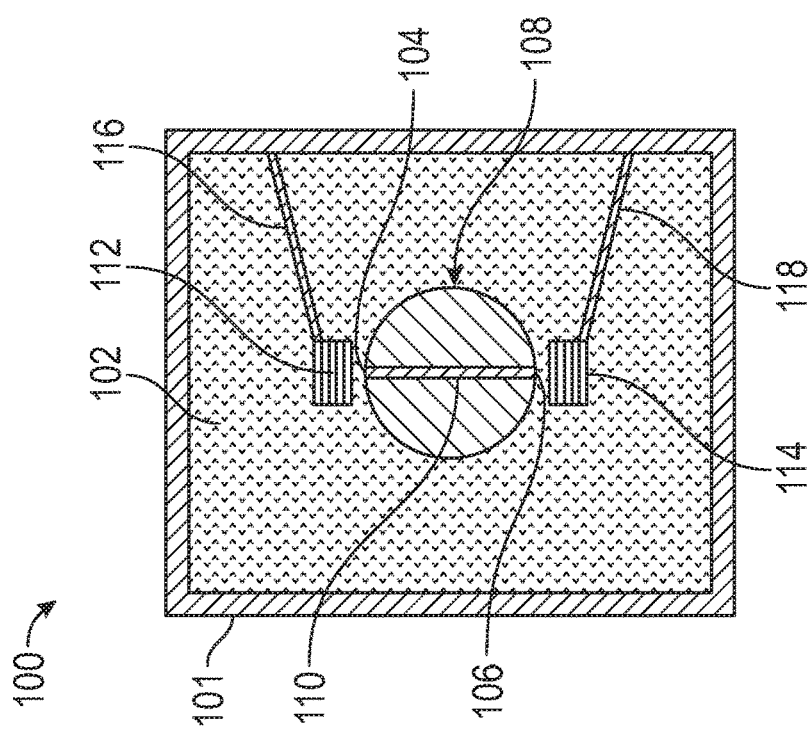

AIRCRAFT ACTUATOR FLUID LEVEL DETECTION

BACKGROUND

Exemplary embodiments pertain to the art of aircraft actuator fluid level detection.

Aircraft often use a variety of leading edge and trailing edge devices to improve angle of attack performance during various phases of flight (e.g., takeoff and landing). One such device is a trailing edge flap. Current trailing edge flaps generally have a stowed position in which the flap forms a portion of a wing, and one or more deployed positions in which the flap extends outwards and down to increase the camber and/or plan form area of the wing. The stowed position is generally associated with low drag at low angles of attack and can be suitable for cruise and other low angle of attack operations. The extended position(s) is/are generally associated with improved air flow characteristics over the aircraft's wing at higher angles of attack. Aircraft actuators may be used to operate such devices or other devices requiring actuation. Such actuators may include fluid for lubrication or operation (e.g., hydraulics).

BRIEF DESCRIPTION

Disclosed is an actuator level detection system of an aircraft. The system includes an actuator containing fluid that defines a resistivity and including a first contact point and a second contact point. The system includes a first contactor disposed about the actuator cooperating with the first contact point to define a first contact resistance that includes the resistivity. The system includes sensor circuitry includes a conductive path defining a conductive path resistance, between the first contact point and the second contact point. The sensor circuitry has a total resistance that includes the first contact resistance and the conductive path resistance.

In addition to one or more of the features described above, or as an alternative, further embodiments may include a controller having stored instructions operable upon execution to quantify the total resistance.

In addition to one or more of the features described above, or as an alternative, further embodiments may include that the stored instructions are further operable upon execution to indicate actuator fluid loss based on the total resistance falling outside a loss threshold.

In addition to one or more of the features described above, or as an alternative, further embodiments may include that the stored instructions are further operable upon execution to indicate contaminated fluid based on the total resistance falling outside a contamination threshold.

In addition to one or more of the features described above, or as an alternative, further embodiments may include that the sensor circuitry is part of radiofrequency identification circuitry having an antenna.

In addition to one or more of the features described above, or as an alternative, further embodiments may include that the radiofrequency identification circuitry includes a resistor having a resistor resistance based on an impedance of the antenna that defines a transmission distance of the radiofrequency identification circuitry.

In addition to one or more of the features described above, or as an alternative, further embodiments may include that the radiofrequency identification circuitry includes an identifier associated with the actuator.

In addition to one or more of the features described above, or as an alternative, further embodiments may include reader circuitry having an impedance substantially equal to the total resistance.

In addition to one or more of the features described above, or as an alternative, further embodiments may include that the reader circuitry is configured to energize the radiofrequency identification circuitry and receive the identifier.

In addition to one or more of the features described above, or as an alternative, further embodiments may include that the fluid has a composition that is air.

In addition to one or more of the features described above, or as an alternative, further embodiments may include that the fluid has a composition that is a lubricant.

In addition to one or more of the features described above, or as an alternative, further embodiments may include a second contactor disposed about the actuator cooperating with the second contact point to define a second contact resistance that includes the resistivity.

Also disclosed is a method for actuator level detection of an aircraft. The method includes receiving a power transmission signal. The method includes energizing radiofrequency identification circuitry having an identifier. The method includes transmitting the identifier. The identifier may be transmitted responsive to a total resistance of sensor circuitry associated with an actuator falling below a loss threshold based on a transmission distance between the radiofrequency identification circuitry and reader circuitry.

In addition to one or more of the features described above, or as an alternative, further embodiments may include that the actuator contains fluid having a resistivity and includes a first contact point and a second contact point; and the total resistance includes a first contact resistance between a first contactor disposed about the actuator cooperating with the first contact point and a second contactor disposed about the actuator cooperating with the second contact point.

In addition to one or more of the features described above, or as an alternative, further embodiments may include that the total resistance falls below the loss threshold when the first contactor contacts the first contact point and the second contactor contacts the second contact point.

Also disclosed is an actuator level detection system of an aircraft. The system includes an actuator containing fluid that defines a resistivity and includes a first contact point and a second contact point. The system includes a first contactor disposed about the actuator cooperating with the first contact point to define a first contact resistance that includes the resistivity. The system includes radiofrequency identification circuitry has an antenna and includes sensor circuitry that includes a conductive path defining a conductive path resistance between the first contact point and the second contact point, the sensor circuitry having a total resistance that includes the first contact resistance and the conductive path resistance.

In addition to one or more of the features described above, or as an alternative, further embodiments may include that the radiofrequency identification circuitry includes a resistor having a resistor resistance based on an impedance of the antenna that defines a transmission distance of the radiofrequency identification circuitry.

In addition to one or more of the features described above, or as an alternative, further embodiments may include that the radiofrequency identification circuitry includes an identifier associated with the actuator.

In addition to one or more of the features described above, or as an alternative, further embodiments may include reader circuitry having an impedance substantially equal to the total resistance.

In addition to one or more of the features described above, or as an alternative, further embodiments may include that the reader circuitry is configured to energize the radiofrequency identification circuitry and receive the identifier.

BRIEF DESCRIPTION OF THE DRAWINGS

The following descriptions should not be considered limiting in any way. With reference to the accompanying drawings, like elements are numbered alike:

FIG. 2A illustrates an axial view of a schematic cross-section of an aircraft actuator having fluid;

FIG. 2B illustrates a side view of schematic cross-section of an aircraft actuator having fluid;

DETAILED DESCRIPTION

A detailed description of one or more embodiments of the disclosed apparatus and method are presented herein by way of exemplification and not limitation with reference to the Figures.

Aircraft actuators are devices that can be used to move, for example, aerodynamic surfaces such as flaps and slats on an aircraft may include or operate according to fluids. Actuators may include any mechanical, electromechanical, hydraulic, pneumatic, or other movement mechanism, including gearboxes, transmissions, gear trains, or other rotating power-translation equipment. Aircraft actuators may include lubricating fluids to reduce friction or operating fluids that move actuators based on hydraulic or pneumatic mechanisms. Fluids may be any liquidous or gaseous state of any matter. The fluids may be non-conductive. Actuators including fluids or operated by fluids may contain or house such fluids. The housed fluids may include intrinsic resistivity characteristics that resist the flow of electrons. As disclosed herein, such resistivity may be used to determine a loss of fluid contained within the actuator. Sensor circuitry may be implemented to determine the fluid levels based on resistances therein.

Figure 1:
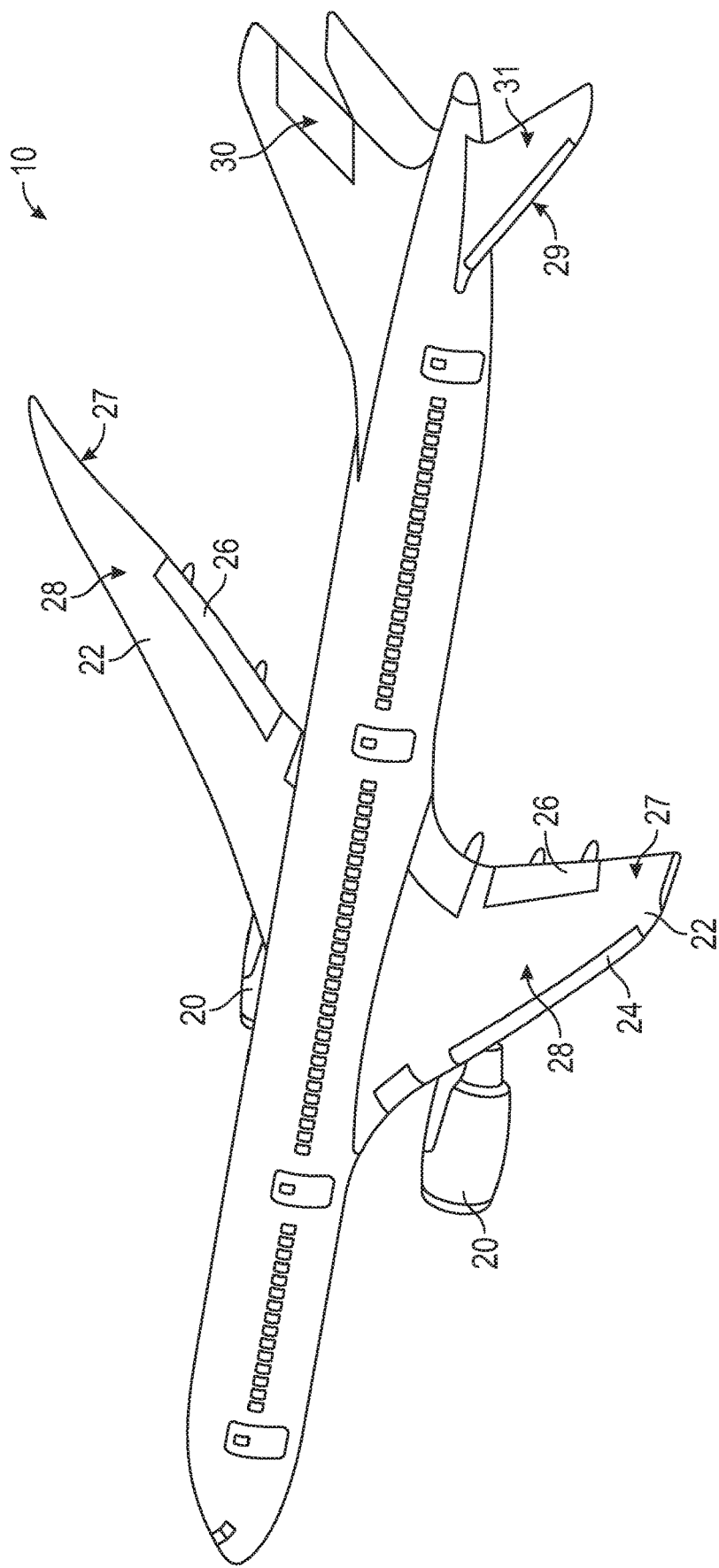
FIG. 1 illustrates an example aircraft.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described. It will be understood that the slats 24 and/or the flaps 26 can include one or more slat/flap panels that move together.

Referring to FIGS. 2A-B, an axial view and a side view cross-sections of an actuator is presented that may be used to operate such devices mentioned herein or other devices requiring actuation. The actuator 100 includes a housing 101 that contains fluid 102. The fluid 102 may be any type of matter in a liquidous or gaseous form. As one non-limiting example, the fluid 102 may include a composition or have a composition of a lubricant. As another non-limiting example, the fluid 102 may be air or include an atmospheric composition from an environment of the actuator 100. The actuator 100 includes, as one non-limiting example, a rotor 108. The rotor 108 may also be any other mechanism or device associated with the actuator 100. The rotor 108 may operate other actuation mechanisms not shown. The rotor 108 may be isolated by gaskets 119 on either side of the actuator 100. The gaskets 119 may seal the fluid 102 within the actuator 100 such that the actuator 100 contains the fluid 102.

The actuator 100 may include a first contactor 112. The first contactor 112 may be disposed proximate the actuator 100. The first contactor 112 may be disposed to contact a first contact point 104 associated with the actuator 100. The first contact point 104 may be located on the rotor 108. The first contact point 104 may be a location proximate the actuator 100. The first contact point 104 may be a conductive surface of the actuator 100. For example, the first contact point 104 may be a copper plating of the actuator 100. The first contactor 112 may be conductively connected offboard the actuator 100 with first conductor 116. The first contactor 112 may be disposed proximate the actuator 100 by a stanchion or support member disposed on the actuator 100. The stanchion may be biased to intermittently connect the first contactor 112 with the first contact point 104. The first conductor 116 may serve as the support member for the first contactor 112.

The actuator 100 may include a second contactor 114. The second contactor 114 may be disposed proximate the actuator 100. The second contactor 114 may be disposed to contact a second contact point 106 associated with the actuator 100. The second contact point 106 may be located on the rotor 108. The second contact point 106 may be a location proximate the actuator 100. The second contact point 106 may be a conductive surface of the actuator 100. For example, the second contact point 106 may be a copper plating. The second contactor 114 may conductively connected offboard the actuator 100 with second conductor 118. The second contactor 114 may be disposed proximate the actuator 100 by a stanchion or support member disposed on the actuator 100. The stanchion may be biased to intermittently connect the second contactor 114 with the second contact point 106. The second conductor 118 may serve as the support member for the second contactor 114.

The actuator 100 may include a conductive path 110. The conductive path 110 may be formed by the conductive material of the actuator 100. As another example, the conductive path 110 may be defined by a conductive portion of the actuator 100. The conductive path 110 may be defined between the first contact point 104 and the second contact point 106. For example, the rotor 108 may include a conductive disc to serve as the conductive path 110.

Figure 3:
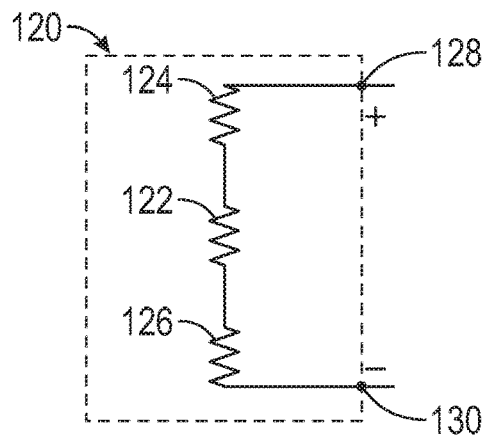
FIG. 3 illustrates sensor circuitry having a total resistance.

Referring to FIG. 3, sensor circuitry 120 is shown. The sensor circuitry 120 may be include a conductive path resistance 122, a first contact resistance 124, and a second contact resistance 126. The conductive path resistance 122 may be a resistance value between the first contact point 104 and the second contact point 106. The sensor circuitry 120 may include a positive connection point 128 and a negative connection point 130. The resistance between the positive connection point 128 and the negative connection point 130 may be a total resistance of the sensor circuitry 120.

The first contact resistance 124 may be defined by a contact resistance between the first contactor 112 and the first contact point 104. The first contact resistance 124 may further include a resistivity of the fluid 102. The resistivity of the fluid 102 may define a fluid resistance dependent on the quantity of fluid between the first contactor 112 and the first contact point 104. As an example, a full fluid level contained in the actuator 100 may result in a higher first contact resistance 124 because of the greater resistivity of the fluid and potential interference caused between the first contactor 112 and the first contact point 104. If the fluid 102 is remove or replaced by another fluid (e.g., atmosphere) as a potential result of fluid evacuation, the first contact resistance 124 may decrease. For example, the first contactor 112 may be biased to mate with the first contact point 104. The fluid 102 may separate the first contactor 112 from the first contact point 104. An actuator fluid loss of fluid 102 may cause the first contact resistance 124 to decrease.

The second contact resistance 126 may be defined by a contact resistance between the second contactor 114 and the second contact point 106. The second contact resistance 126 may further include a resistivity of the fluid 102. The resistivity of the fluid 102 may define a fluid resistance dependent on the quantity of fluid between the second contactor 114 and the second contact point 106. As an example, a full fluid level contained in the actuator 100 may result in a higher second contact resistance 126 because of the greater resistivity of the fluid and potential interference caused between the second contactor 114 and the second contact point 106. If the fluid 102 is remove or replaced by another fluid (e.g., atmosphere) as a potential result of fluid evacuation, the second contact resistance 126 may decrease. For example, the second contactor 114 may be biased to mate with the second contact point 106. The fluid 102 may separate the second contactor 114 from the second contact point 106. An actuator fluid loss of fluid 102 may cause the second contact resistance 126 to decrease.

Those of skill in the art would appreciate that any number and arrangement of contact resistances 124, 126, contactors 112, 114, and contact points 104, 106 may be used to generate the total resistance associated with the sensor circuitry 120. For example, only one contact resistance, one contactor and one contact point may be used. As another example, many contact resistances, contactors, and contact points may be used.

Figure 4A:
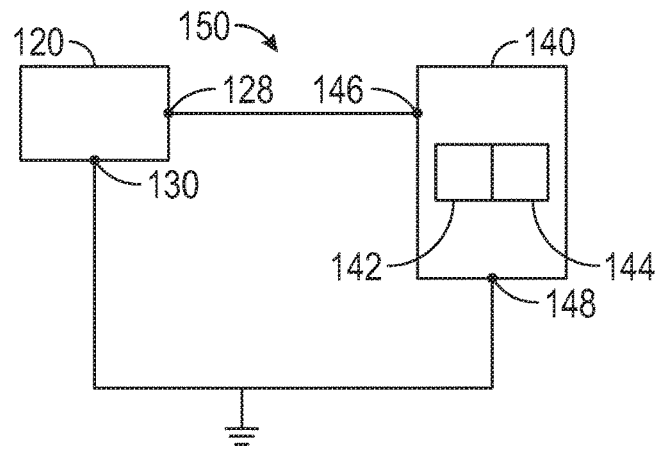
FIG. 4A illustrates sensor circuitry connected with a controller.

Referring to FIG. 4A, an actuator level detection system 150 of an aircraft 10 is shown. The actuator level detection system 150 includes sensor circuitry 120 connected via connection point 128 to a controller 140 at input 146. As an example, the input 146 may be a digital or analog input. An electrical signal from the sensor circuitry 120 may be based on the total resistance of the sensor circuitry 120 and electrically transmitted as a current or voltage value through any combination of electrical conversions. A driver circuit may be part of the controller 140 or a standalone device to provide indication of the total resistance of the sensor circuitry 120 to the controller 140. The controller 140 may include any number of processors 142 and memory 144 to execute stored instructions for quantifying the total resistance of the sensor circuitry 120.

The controller 140 may include any combination of processors, field programmable gate arrays (FPGA), or application specific integrated circuits (ASIC). The controller 140 may include memory 144, volatile and non-volatile, operable to store machine instructions from the processors 142 and other processing mechanisms to receive, calculate, and control devices, as necessary. Non-volatile instructions may generate volatile instructions operable upon execution to quantify the total resistance. Machine instructions may be stored (e.g., stored instructions, stored machine instructions, stored steps) in any language or representation, including but not limited to machine code, assembly instructions, C, C++, C#, PASCAL, COBAL, PYTHON, JAVA, and RUBY. It should be appreciated that any type of wired or wireless configuration is appreciated for any of the communications from the controller 140. Wireless protocols such as ZIG-BEE, WI-FI, BLUETOOTH, or any other implement may be used. Communications may be realized through any protocol or medium known or unknown. Connection point 130 may be connected to a common ground with the controller 140 through ground connection 148. The sensor circuitry 120 and the controller 140 may also include isolated grounds.

Figure 4B:
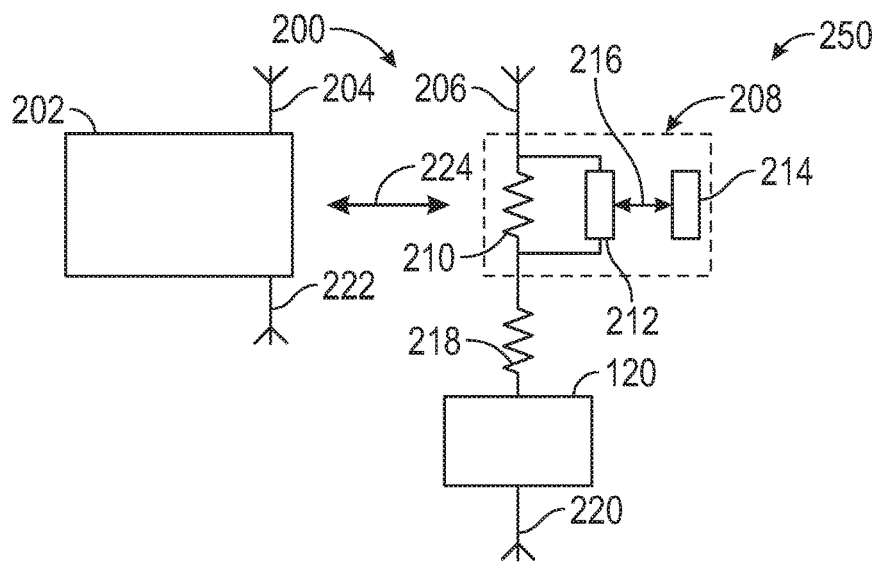
FIG. 4B illustrates sensor circuitry connected with radiofrequency identification circuitry.

Referring to FIG. 4B, an actuator level detection system 250 of an aircraft 10 is shown. The actuator level detection system 150 may include radiofrequency identification circuitry 200. The radiofrequency identification circuitry 200 may include reader circuitry 202 including a power source and power transmission antenna 204. The power transmission antenna 204 transmits power to the power receiving antenna 206 associated with the RFID transmitter 208.

The RFID transmitter 208 is energized by the reader circuitry 202. The radiofrequency identification circuitry 200 may be a near-field or far-field device employed to retrieve the identifier 214 from the RFID transmitter 208. The RFID transmitter 208 may include a load resistor 210 and radio wave generation circuitry 212. The radio wave generation circuitry 212 generates radiofrequency waves based on the identifier 214. The identifier may include any sufficiently unique amount of data to identify the sensor circuitry 120 by location, number, name, purpose, or other identification information. The RFID transmitter 208 is associated with a resistor 218 having a resistor resistance based on the impedance of reader receiver antenna 222. That is, the resistor 218 may be calibrated to march the impedance of the RFID transmitter 208 and the reader receiver antenna 222. It should be appreciated that the resistor 218 may be any type of Pi-network, T-network or another implement used to match impedance of the reader receiver antenna 222 with the RFID transmitter antenna 220.

The resistor 218 may be combined with the sensor circuitry 120 to properly match impedance with the RFID transmitter 208 when the fluid 102 is out of the actuator 100. That is, when the fluid 102 has evacuated out of the actuator 100 the impedance of the RFID transmitter antenna 220 is properly matched with the reader receiver antenna 222 such that full power transmission or any transmission at all is received by the reader circuitry 202. As such, indication of an actuator fluid loss of fluid 102 of the actuator 100 is communicated to the reader circuitry 202 when the signal associated with the travels the transmission distance 224 where the reader receiver antenna 222 is located.

As those versed in the art would readily appreciate, combinations of parts and components in FIGS. 4A-B may be combined or interchanged as necessary to implement level detection of actuators. Any combination of controllers 140 and radiofrequency identification circuitry 200 may be used.

Figure 5:
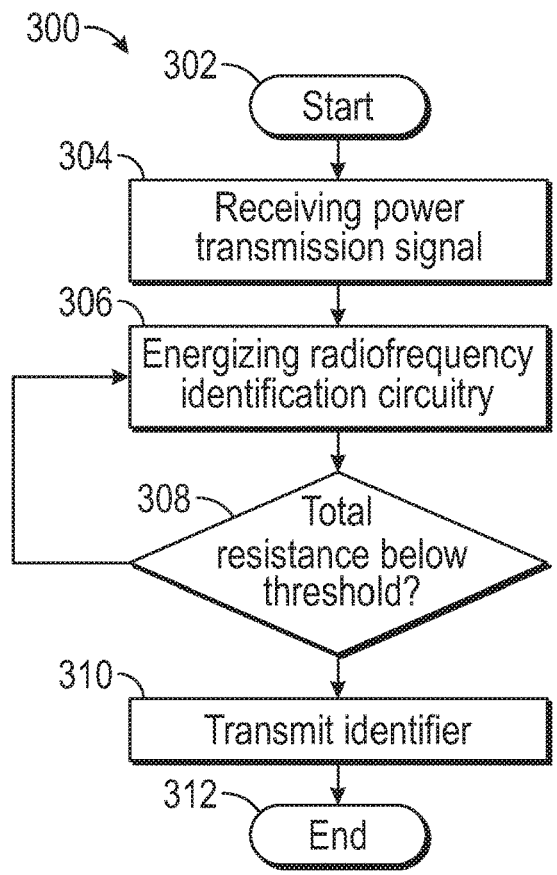
FIG. 5 illustrates a method of implementing sensory detection.

Referring to FIG. 5, a method 300 is shown. It should be appreciated that any of the enumerated blocks may be omitted, rearranged, performed in parallel, duplicated, or otherwise changed. The method 300 begins in block 302. In block 304, a power transmission signal is received. The power transmission signal may be received from reader circuitry 202 or some other source. The power transmission signal may be received from the sensor circuitry 120 at the controller 140. Radiofrequency identification circuitry 200 or portion thereof may be energized in block 306. The radiofrequency identification circuitry 200 or portion thereof may receive the power transmission signal to energize the circuitry associated with identifier 214. In block 308, the total resistance of the sensor circuitry 120 is quantified to determine whether it is below a threshold. The threshold, and all thresholds discussed herein, may be a threshold related to an actuator fluid loss of fluid 102 or a threshold related to contamination of the fluid 102. For example, the actuator 100 release particulates due to wear that are entrained in the fluid 102, leaving contaminated fluid to be contained by the housing. Such particulates may decrease the resistivity of the fluid 102 and allow detection of such particulates by the sensor circuitry 120. If the total resistance of the sensor circuitry 120 is below one of the thresholds in block 308, the identifier 214 is transmitted in block 310. The controller 140 may also indicate as such in block 310. In block 312 the method 300 ends or repeats.

Figure 6:
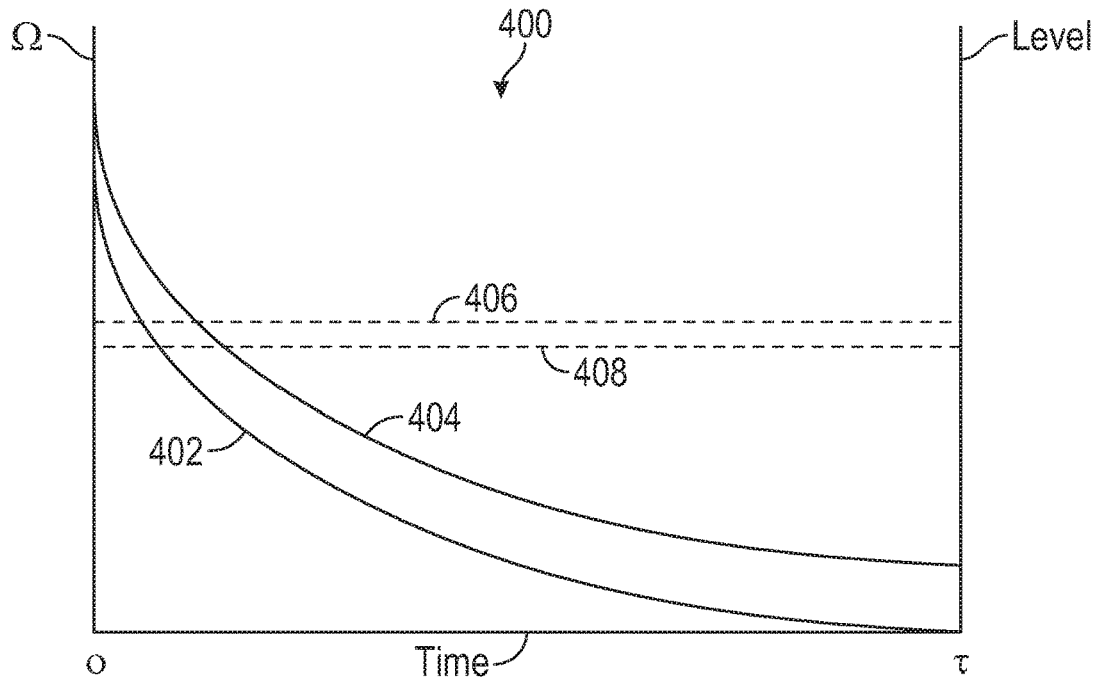
FIG. 6 illustrates a graph depicting a change in fluid level corresponding with a change in sensor circuitry resistance.

Referring to FIG. 6 a graph 400 is shown. The graph 400 includes a fluid level 402 associated with the fluid 102. As the fluid level 402 drops, becomes contaminated, or both, the total resistance 404 of the sensor circuitry 120 reduces. As the total resistance 404 decreases below the loss threshold 406, the controller 140 may notify as such. As the total resistance 404 decreases below the contamination threshold 408, the controller 140 may notify as such. As the total resistance 404 decreases below the loss threshold 406, the radiofrequency identification circuitry 200 may send the identifier 214 to the reader circuitry 202. As the total resistance 404 decreases below the contamination threshold 408, the radiofrequency identification circuitry 200 may send the identifier 214 to the reader circuitry 202.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An actuator level detection system of an aircraft, the system comprising:
   an actuator containing fluid that defines a resistivity and including a first contact point and a second contact point in a housing;
   a first contactor disposed about the actuator cooperating with the first contact point to define a first contact resistance that includes the resistivity; and
   sensor circuitry including a conductive path defining a conductive path resistance, between the first contact point and the second contact point in the housing, the sensor circuitry having a total resistance that includes the first contact resistance and the conductive path resistance to detect a change in fluid level corresponding with a change in sensor circuitry resistance over time,
   wherein maintenance of the actuator is controlled based on the detected change in fluid level in the actuator and the actuator is a mechanical actuator.

2. The actuator level detection system of claim 1, further comprising a controller having stored instructions operable upon execution to quantify the total resistance.

3. The actuator level detection system of claim 2, wherein the stored instructions are further operable upon execution to indicate actuator fluid loss based on the total resistance falling outside a loss threshold.

4. The actuator level detection system of claim 2, wherein the stored instructions are further operable upon execution to indicate contaminated fluid based on the total resistance falling outside a contamination threshold.

5. The actuator level detection system of claim 1, wherein the sensor circuitry is part of radiofrequency identification circuitry having an antenna.

6. The actuator level detection system of claim 5, wherein the radiofrequency identification circuitry includes a resistor having a resistor resistance based on an impedance of the antenna that defines a transmission distance of the radiofrequency identification circuitry.

7. The actuator level detection system of claim 5, wherein the radiofrequency identification circuitry includes an identifier associated with the actuator.

8. The actuator level detection system of claim 7, further comprising reader circuitry having an impedance substantially equal to the total resistance.

9. The actuator level detection system of claim 8, wherein the reader circuitry is configured to energize the radiofrequency identification circuitry and receive the identifier.

10. The actuator level detection system of claim 1, wherein the fluid has a composition that is air.

11. The actuator level detection system of claim 1, wherein the fluid has a composition that is a lubricant.

12. The actuator level detection system of claim 1, further comprising a second contactor disposed about the actuator cooperating with the second contact point to define a second contact resistance that includes the resistivity.

* * * * *